No. 770,919. Patented September 27, 1904.

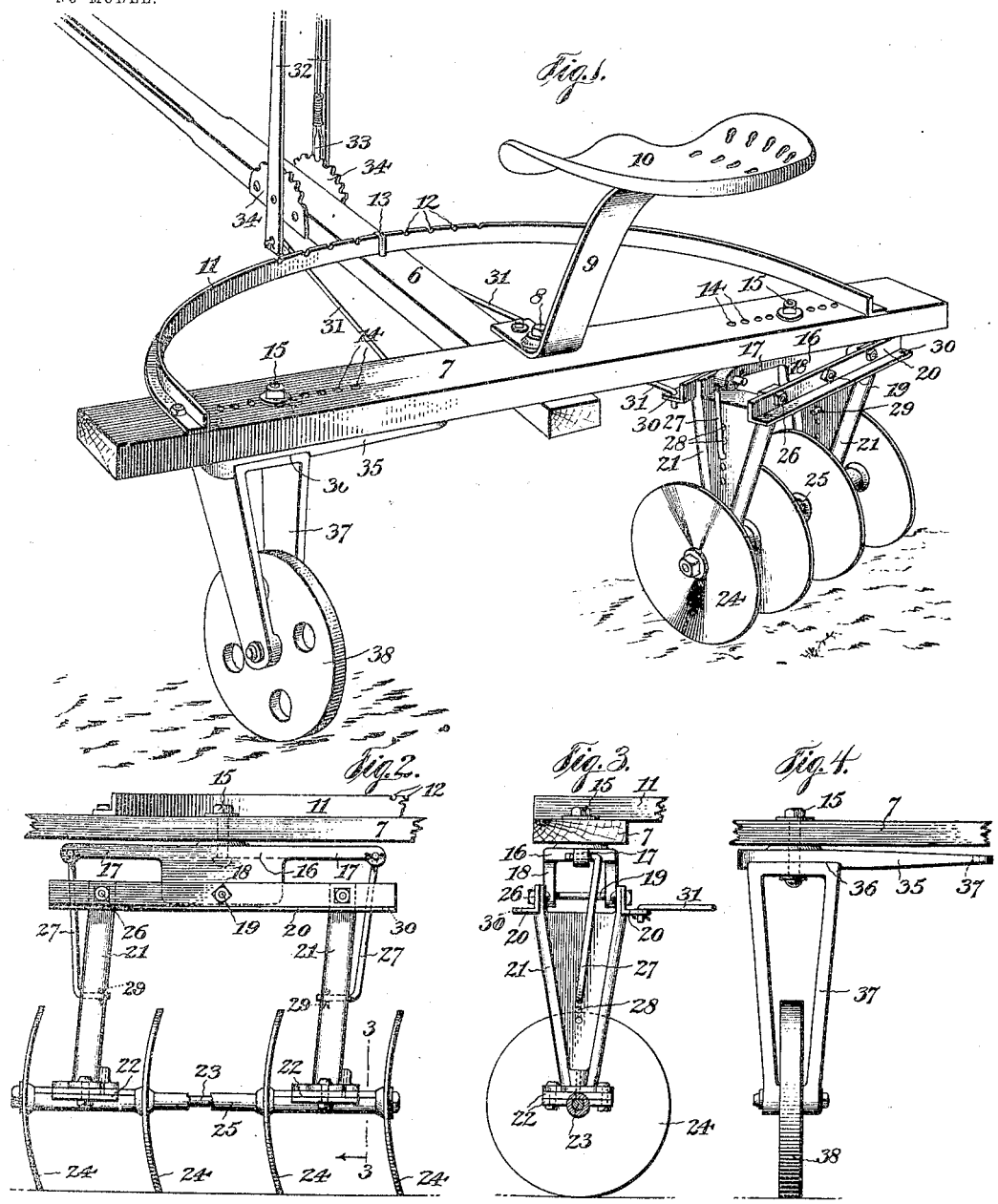

UNITED STATES PATENT OFFICE.

AUGUSTA POSTELLE McKAY, OF ZENITH, GEORGIA.

DISK CULTIVATOR.

SPECIFICATION forming part of Letters Patent No. 770,919, dated September 27, 1904.

Application filed October 27, 1903. Serial No. 178,779. (No model.)

*To all whom it may concern:*

Be it known that I, AUGUSTA POSTELLE MC-KAY, a citizen of the United States of America, residing at Zenith, in the county of Crawford and State of Georgia, have invented certain new and useful Improvements in Disk Cultivators; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to disk cultivators, and has for its object means to reverse the gangs to cause them to throw either sidewise or toward the center; means to adjust the gangs to reverse or to level hilling already made; means to aline the gangs and set the alined gangs at an angle to the line of draft, so that there will be no hilling whatever, and, finally, to provide an attachment to replace one of the gangs of disks that will take most of the weight of the operator on the seat and at the same time compensate the lateral pull of the disks, whereby the harrow-disks will be located a sufficient distance to one side of the driver to enable the working of orchards and under the low branches of trees.

The further object of the invention is to reduce the number of parts of the cultivator as much as possible and simplify the parts and their adjustments, at the same time providing an implement adapted to all the uses desired of a cultivator.

Referring to the drawings, in which like parts are similarly designated, Figure 1 is a perspective view of the cultivator. Fig. 2 is an elevation of one of the gangs of disks. Fig. 3 is a section on line 3 3, Fig. 2; and Fig. 4 shows the wheel attachment to replace one of the gangs of disks.

The pole 6 is pivoted to the beam 7 by a bolt 8, that also passes through the base of the support 9 for the seat 10. Near each end of the beam is fastened the ends of an arc 11, preferably, though not necessarily, made of angle-iron and having notches 12. A hook or eye 13 takes into these notches and passes through the pole 6 and is secured by a nut (not shown) on the under side of the pole.

The beam 7 is provided with a series of holes 14 at each side, through any one of which passes the pivot-bolt 15, one for each gang of disks. This bolt holds in place a pivot-block 16, having lateral arms 17 and depending flanges 18. Passing through the flanges 18 is a bolt 19, that pivotally holds in place an angle-bar 20 at each side of the block 16. Secured to these bars 20 by bolts 26 are shaft-hangers 21 for the disk gangs. Each hanger 21 has at its end a two-part bearing 22, that carries the gang-shaft 23, one disk 24 being on the shaft 23 at each end of the bearing and a spacing-sleeve 25 being placed between the two middle disks of each gang. Although I prefer the described means for mounting the disks on the shafts and the latter in the hangers, any other structure may be used that is preferable or expedient. In the end of each arm 17 of the pivot-block 16 is pivoted or otherwise suitably connected a rod or hook 27, that may enter any one of a number of holes 28 in the hanger adjacent thereto and held in place by a spring cotter-pin 29 or other device. Each angle-bar 20 has in each end of its horizontal flange a hole 30 for the reception of the hook end of a connecting-rod 31, that is operated by a hand-lever 32, held by a spring-latch 33, taking into an arc 34, there being a hand-lever, arc, and connecting-rod for each gang.

When desirable or necessary, one gang of disks can be removed by taking out the bolt 15 and the wheel shown in Fig. 4 put in place thereof. This consists of plate 35, having a single arm or extension 36, provided with a hole 37 for the reception of the hook end of one of the connecting-rods 31. In the lower face of the plate 35 is a recess 36 for the two-armed wheel-support 37, that has journaled in its lower end a wheel 38.

As shown in Fig. 1, the disks are set to throw toward the center, hilling straddle row, and by operating the levers 32 the angularity of each gang can be independently adjusted. By removing the hook ends of the connecting-rods 31 from their holes 30 each gang can be reversed to throw outward to hill between rows or to the side. By removing bolt 15 and placing it in another hole 14 the gangs can be set to and from each other. It is often very desirable to list the sets of disks so that either the outer or the inner end of each gang will cut deeper than the other to reverse the hilling or cut it flat, and to accomplish this the pivoted bars 27 are removed from the holes 28 and set one or two holes higher or lower, as the case may be. When cultivating a flat field, the disks are alined and set to throw one way only and the whole beam 7, with the disks, set at an angle to the line of draft, this being done by lifting the hook 13, rotating the beam on the pole so that the hook 13 will take into the desired notch 12 to one side of the center of the arc 11. For cultivating under trees one gang is removed by taking out bolt 15 and the wheel, Fig. 4, bolted in its place, the end of rod 31 taking into the hole 37 in the extension 36. The seat is then bolted to the beam 7 through one of the holes 14 on that side that carries the wheel, so that the driver will be clear of branches, while the gang of disks will work under the tree and the greater part of the weight of the driver be carried by the wheel instead of the disks. The wheel can then be set at an angle to take up or neutralize the lateral pressure of the disks due to their angular position.

Having thus described my invention, what I claim as new therein, and desire to secure by Letters Patent, is—

1. In a disk cultivator, the combination with a detachable pole; of a beam pivoted thereto, a gang of disks pivoted thereto and adjustable to and from the pole, means to list the gang, an arc to set the beam in angular relation to the pole, a road-wheel pivoted to the beam and adjustable to and from the pole, a seat secured to the beam and means to secure the seat in positions at each end of the beam, substantially as described.

2. In a disk cultivator, the combination with a beam having series of holes therein, a pole pivoted to the beam; of a pivot-block pivoted to the beam, a shaft-hanger suspended from the pivot-block and adjusting-bars pivoted to the pivot-block to engage the hanger to list it, substantially as described.

3. In a disk cultivator, the combination with a beam having a series of holes therein, a pole pivoted to the beam; of a pivot-block pivoted to the beam and having lateral arms, bars pivoted to the block, a shaft-hanger pivoted between the bars and a hook pivoted in each arm to engage a hanger, substantially as described.

4. In a disk cultivator, the combination with a beam having adjusting-holes at each end, a pole secured thereto, a pivot-block beneath the beam, a pivot passing through the block and a hole in the beam, a gang of disks pivoted to the block and means between the block and gang of disks to hold the gang listed, substantially as described.

5. In a cultivator, the combination with a straight beam, a gang of cultivator-disks and a removable pivot to pivotally secure the gang to the beam; of a plate having an extension thereon, and a seat formed therein, a wheel-support in said seat, a pivot to connect said plate and wheel-support to the beam and a wheel secured in the end of the wheel-support, substantially as described.

6. The combination with a straight beam having a series of holes at each end, a pole pivoted thereto, a notched arc having its ends secured near the ends of the beam and means to secure the arc to the pole; of a gang of cultivator-disks, a pivot to secure the gang in any one of the holes in the beam, means to hold the gang listed, a lever to rotate the gang on its pivot, a plate and wheel-support, and a pivot to secure said plate and wheel-support in any one of the holes in the beam, a road-wheel in the wheel-support and a lever to rotate the wheel on its pivot, substantially as described.

7. In a cultivator, the combination with the beam, of a pivot-block, two bars pivoted to the block, a shaft-hanger secured to the bars on each side of their pivot-point, a shaft and a gang of cultivators held in said hangers and rods having hooked ends, said hooked ends adapted to engage the shaft-hangers and hold them in listed position, substantially as described.

In testimony that I claim the foregoing as my invention I have signed my name in presence of two subscribing witnesses.

AUGUSTA POSTELLE McKAY.

Witnesses:
PHIL OGLETREE,
GEO. McCARTY.